US011192598B2

(12) United States Patent
Schutt

(10) Patent No.: US 11,192,598 B2
(45) Date of Patent: Dec. 7, 2021

(54) FIFTH WHEEL MOUNTING BRACKET WITH ISOLATION AREAS ASSISTING IN FORCE MEASUREMENT

(71) Applicant: SAF-HOLLAND, Inc., Muskegon, MI (US)

(72) Inventor: Randy Schutt, Muskegon, MI (US)

(73) Assignee: SAF-HOLLAND, Inc., Muskegon, MI (US)

(*) Notice: Subject to any disclaimer, the term of this patent is extended or adjusted under 35 U.S.C. 154(b) by 252 days.

(21) Appl. No.: 16/485,305

(22) PCT Filed: Jan. 12, 2018

(86) PCT No.: PCT/US2018/013503
§ 371 (c)(1),
(2) Date: Aug. 12, 2019

(87) PCT Pub. No.: WO2018/151881
PCT Pub. Date: Aug. 23, 2018

(65) Prior Publication Data
US 2019/0375470 A1 Dec. 12, 2019

Related U.S. Application Data

(60) Provisional application No. 62/458,816, filed on Feb. 14, 2017.

(51) Int. Cl.
B62D 53/00 (2006.01)
B62D 53/06 (2006.01)
B62D 53/08 (2006.01)
B60D 1/01 (2006.01)

(52) U.S. Cl.
CPC ......... *B62D 53/06* (2013.01); *B62D 53/0807* (2013.01); *B60D 1/015* (2013.01)

(58) Field of Classification Search
CPC ..... B62D 53/06; B62D 53/0807; B60D 1/015
See application file for complete search history.

(56) References Cited

U.S. PATENT DOCUMENTS

| 3,661,220 A | 5/1972 | Harris |
| 3,854,540 A | 12/1974 | Holmstrom, Jr. |
| 4,020,911 A | 5/1977 | English et al. |

(Continued)

FOREIGN PATENT DOCUMENTS

WO 2017142844 A1 8/2017

OTHER PUBLICATIONS

ISA/US; International Search Report; dated Feb. 27, 2018.
The Hague; Supplementary European Search Report; dated Dec. 7, 2020.

*Primary Examiner* — Kevin Hurley
*Assistant Examiner* — Marlon A Arce
(74) *Attorney, Agent, or Firm* — Price Henveld LLP

(57) ABSTRACT

A fifth wheel mounting bracket includes a mounting bracket including a coupling portion configured to pivotally couple to a fifth wheel hitch plate, the mounting bracket including an innermost surface and an outermost surface defining a mounting bracket thickness, at least one isolation area having isolation area thickness that is less than the mounting bracket thickness, and at least one strain gauge positioned within the at least one isolation area and configured to measure a strain of the fifth wheel mounting bracket arrangement.

22 Claims, 14 Drawing Sheets

(56) References Cited

U.S. PATENT DOCUMENTS

| | | | |
|---|---|---|---|
| 4,666,003 A | | 5/1987 | Reichow |
| 5,226,702 A | | 7/1993 | Brown et al. |
| 5,228,527 A | | 7/1993 | Kroll et al. |
| 5,435,194 A | | 7/1995 | Schedrat et al. |
| 5,811,738 A | * | 9/1998 | Boyovich .............. G01G 19/12 177/136 |
| 5,880,409 A | * | 3/1999 | Hartman ................ G01G 19/12 177/137 |
| 6,118,083 A | | 9/2000 | Boyovich et al. |
| 6,495,774 B1 | | 12/2002 | Pederson |
| 7,506,538 B2 | * | 3/2009 | Reichow ................ G01G 19/08 73/117.03 |
| 7,633,020 B2 | * | 12/2009 | Santi .................... G01G 19/083 141/21 |
| 9,108,483 B2 | * | 8/2015 | Preijert ..................... F16F 1/38 |
| 2002/0067025 A1 | | 6/2002 | Gisinger et al. |
| 2004/0226755 A1 | | 11/2004 | Pottebaum et al. |
| 2016/0257355 A1 | * | 9/2016 | Siuchta ................. B60W 40/13 |
| 2019/0113402 A1 | * | 4/2019 | Schutt ..................... G01G 1/00 |

\* cited by examiner

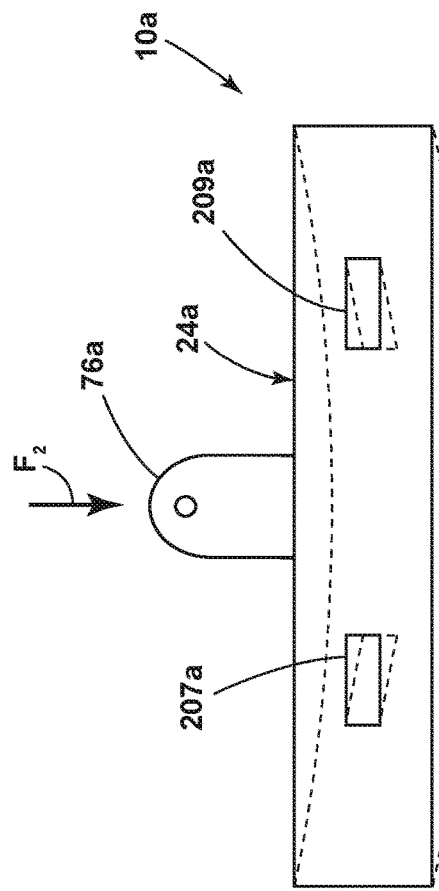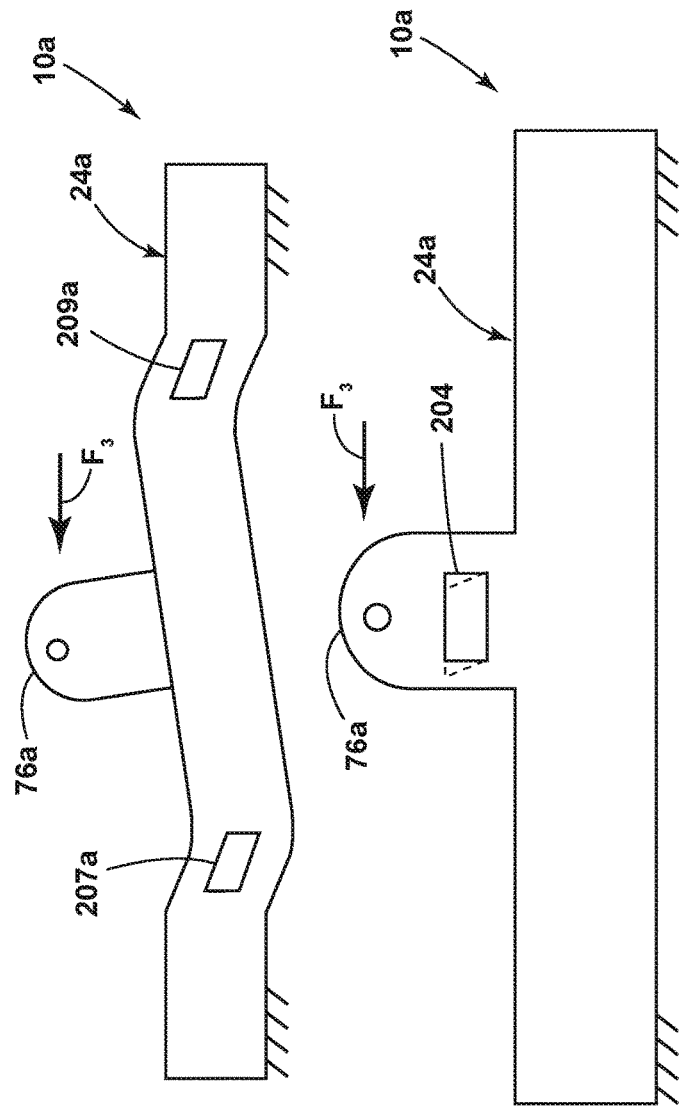

FIFTH WHEEL MOUNTING BRACKET WITH ISOLATION AREAS ASSISTING IN FORCE MEASUREMENT

BACKGROUND OF THE INVENTION

The present invention generally relates to fifth wheel mounting brackets designed to allow for the measurement and calculation of forces exerted upon the mounting brackets during use.

BRIEF SUMMARY OF THE INVENTION

One aspect of the invention includes a fifth wheel mounting bracket arrangement that includes a mounting bracket, including an elongated mounting beam configured to extend along a vehicle frame rail; a coupling portion configured to pivotally couple to a fifth wheel hitch plate, and a plurality of pillars disposed between the coupling portion and the elongated mounting beam, the plurality of pillars including a first pillar, a second pillar positioned outward of the first pillar, a third pillar positioned forward of the first pillar, and a fourth pillar positioned forward of the second pillar and outward of the third pillar, the plurality of pillars cooperating to form a void space beneath the coupling portion. The fifth wheel mounting bracket arrangement further includes at least one strain gauge configured to measure a strain of the fifth wheel mounting bracket arrangement, wherein the elongated mounting beam includes an inward facing surface, an outward facing surface, a forward end, a rear end, a first recess disposed within the inward facing surface, a second recess disposed within the outward facing surface, a third recess disposed within the inward facing surface and positioned rearward of the first recess, and a fourth recess disposed within the outward facing surface and positioned rearward of the second recess, wherein at least one strain gauge is attached to the first recess, the second recess, the third recess, and the fourth recess of the elongated mounting beam, and wherein at least one strain gauge is attached to the first pillar, the second pillar, the third pillar and the fourth pillar.

Another aspect of the invention includes a method of measuring forces exerted on a fifth wheel mounting bracket arrangement, including providing a fifth wheel mounting bracket configured to pivotally support a fifth wheel hitch plate, the fifth wheel mounting bracket including an innermost surface and an outermost surface defining a bracket thickness, the fifth wheel mounting bracket further including at least one isolation area having an isolation area thickness that is less than the bracket thickness, affixing at least one strain gauge to the at least one isolation area, exerting a force to the fifth wheel mounting bracket, measuring a strain of the fifth wheel mounting bracket via the strain gauge, and calculating the force exerted on the fifth wheel mounting bracket.

Yet another aspect of the invention includes a method of calculating forces exerted on a structure supporting a fifth wheel mounting plate, including providing a structure operably coupled to a fifth wheel mounting plate, affixing a strain gauge to an isolation area on the structure where a strain is to be measured, exerting a force on the structure, measuring the strain via the strain gauge, and calculating the force exerted on the structure, wherein the force includes at least one of a force in the forward direction, a force in the lateral direction, and a roll force.

These and other features, advantages, and objects of the present invention will be further understood and appreciated by those skilled in the art by reference to the following specification, claims, and appended drawings.

BRIEF DESCRIPTION OF THE DRAWINGS

FIGS. 15-17 are each schematic side elevational views of the fifth wheel mounting brackets and strain gauges of FIG. 12 deflecting in response to applied forces.

DETAILED DESCRIPTION OF THE PREFERRED EMBODIMENTS

Figure 1:
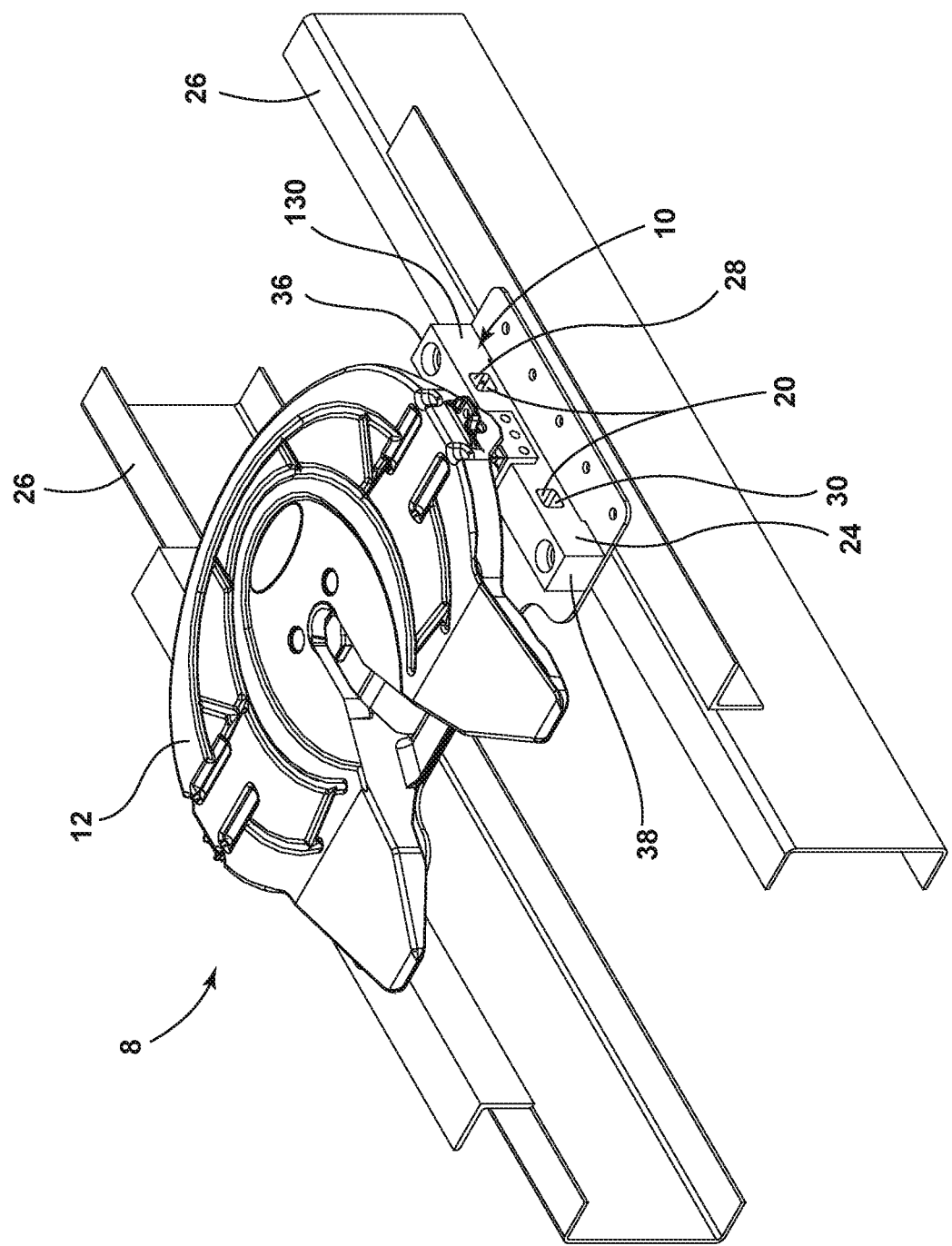
FIG. 1 is a perspective view of a pair of fifth wheel mounting brackets supporting a fifth wheel hitch plate.
Figure 2:
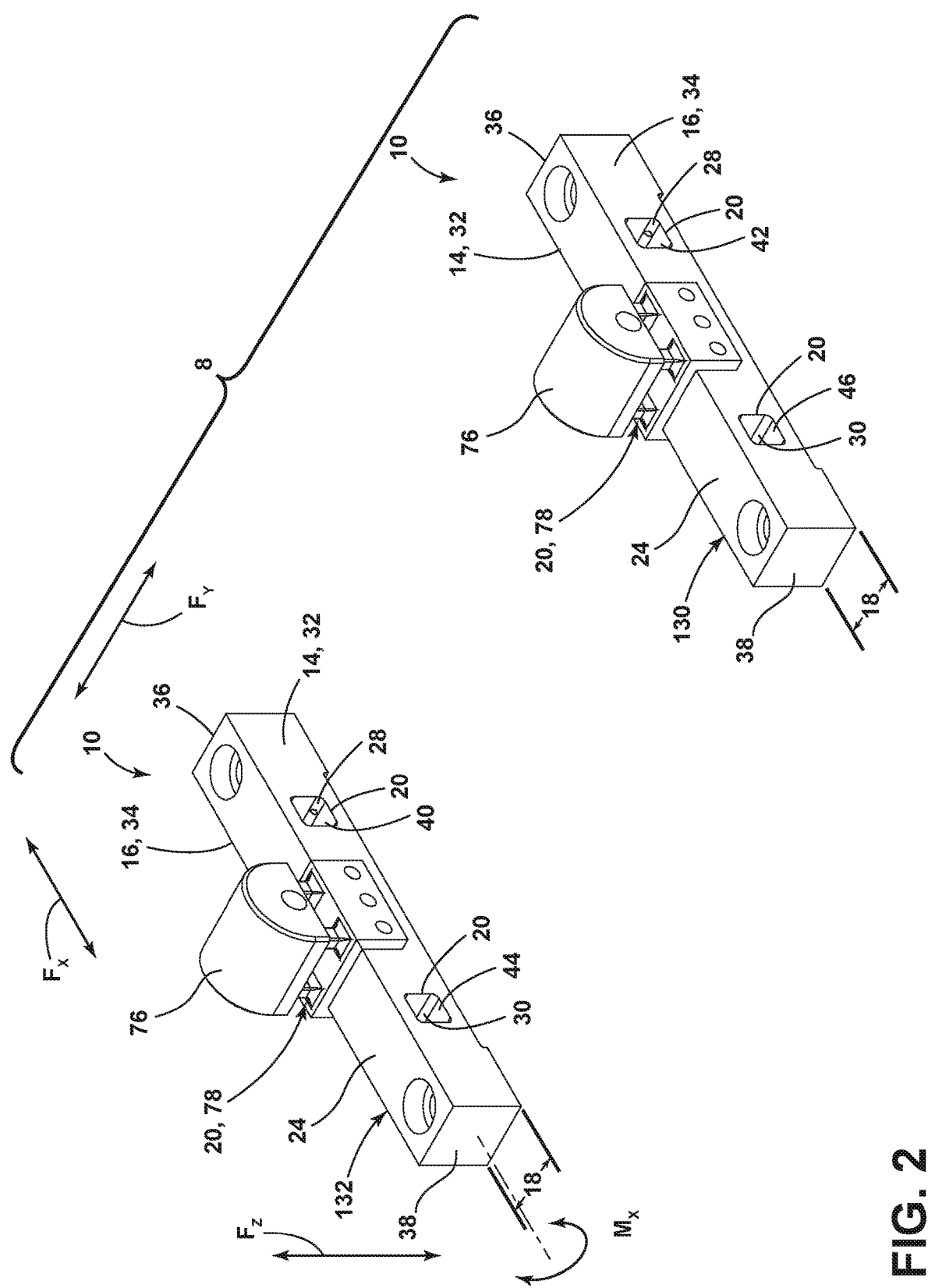
FIG. 2 is a perspective view of a pair of fifth wheel mounting brackets with the fifth wheel hitch plate and supporting structure not shown.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a fifth wheel hitch support arrangement 8 includes a fifth wheel mounting bracket 10 configured to pivotally support a fifth wheel hitch plate 12 is illustrated. Additionally illustrated is a vehicle frame rail 26, which helps support the mounting bracket 10.

Referring to FIG. 2, the fifth wheel hitch plate 12 and other components have been removed from the illustration of FIG. 1 to highlight the two opposing fifth wheel mounting brackets 10, a right mounting bracket 130 and a left mounting bracket 132, that pivotally support the fifth wheel hitch plate 12. Any discussion herein directed to a mounting bracket 10 naturally relates to both the right mounting bracket 130 and left mounting bracket 132.

Each fifth wheel mounting bracket 10 (FIGS. 1-3) includes an innermost surface 14 and an outermost surface 16. Innermost and outermost are terms used to define orientation of the surface when opposing fifth wheel mounting brackets 10 are pivotally supporting a fifth wheel hitch plate 12, such as illustrated in FIG. 1. The innermost surface 14 and the outermost surface 16 define a bracket thickness 18. The fifth wheel mounting bracket 10 further includes at least one isolation area 20. In the illustrated example, the fifth wheel mounting bracket 10 includes two isolation areas 20, each having an isolation area thickness 22. The isolation area thickness 22 is less than the bracket thickness 18.

Figure 3:
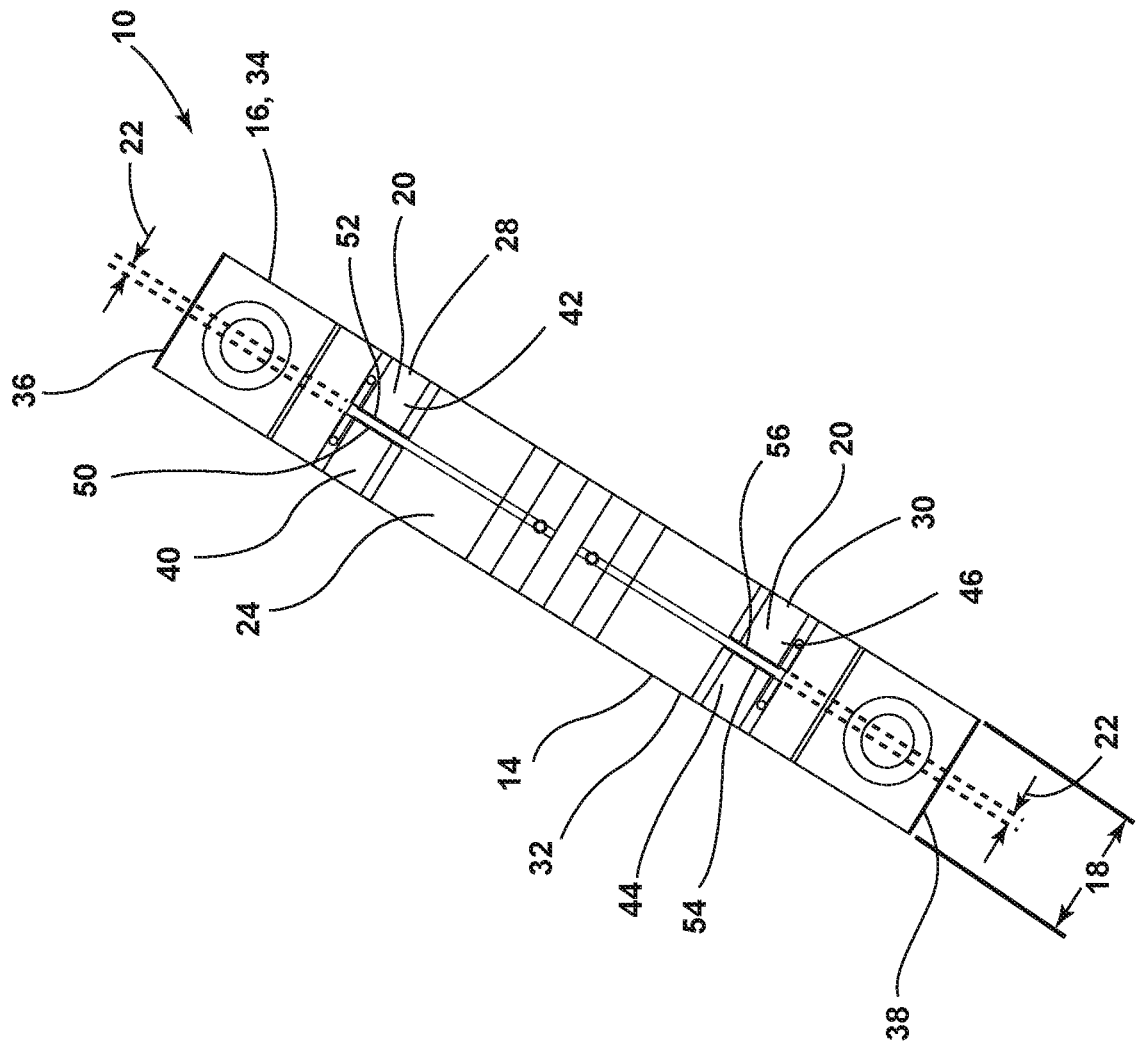
FIG. 3 is a top plan view of an embodiment of an elongated mounting beam of the present invention showing isolation areas.

The fifth wheel mounting bracket 10 further includes an elongated mounting beam 24 configured to extend along the vehicle frame rail 26. As FIGS. 1-3 illustrate, the isolation area 20 can be part of the elongated mounting beam 24 portion of the fifth wheel mounting bracket 10. The isolation area 20 may include multiple isolation areas. For example, the elongated mounting beam 24 illustrated in FIGS. 1-3 includes a first isolation area 28 and a second isolation area 30. The second isolation area 30 can be positioned rearward of the first isolation area 28.

Figure 4:
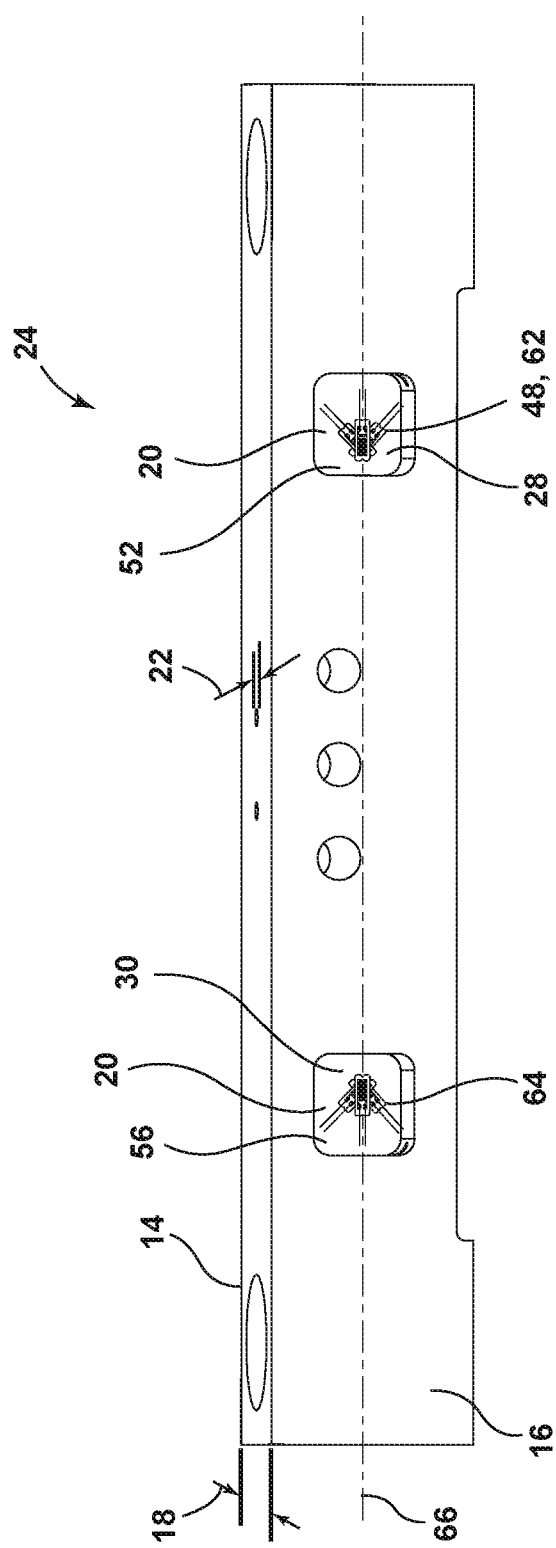
FIG. 4 is a side elevational view of an embodiment of an elongated mounting beam of the present invention showing isolation areas.

In the illustrated example, the elongated mounting beam 24 includes an inward facing surface 32, an outward facing surface 34, a forward end 36, and a rear end 38. A first recess 40 is disposed within the inward facing surface 32, a second recess 42 is disposed within the outward facing surface 34, and the first recess 40 and the second recess 42 cooperate to form the first isolation area 28. A third recess 44 is disposed within the inward facing surface 32, a fourth recess 46 is disposed within the outward facing surface 34, and the third recess 44 and the fourth recess 46 cooperate to form the second isolation area 30 that is positioned rearward of the first isolation area 28. Referring to FIG. 4, the elongated mounting beam 24 of the fifth wheel mounting bracket 10 again includes an innermost surface 14 and an outermost surface 16, that cooperate to define a bracket thickness 18. The elongated mounting beam 24 of the fifth wheel mounting bracket 10 again includes at least one isolation area 20 having an isolation area thickness 22 that is less than the bracket thickness 18.

In use, at least one strain gauge 48 is affixed to the at least one isolation area 20. The strain gauge 48 is then used to measure a strain where the at least one strain gauge 48 is located, allowing calculation of a force exerted on the fifth wheel mounting bracket 10 of which the elongated mounting beam 24 is a part.

Figure 5:
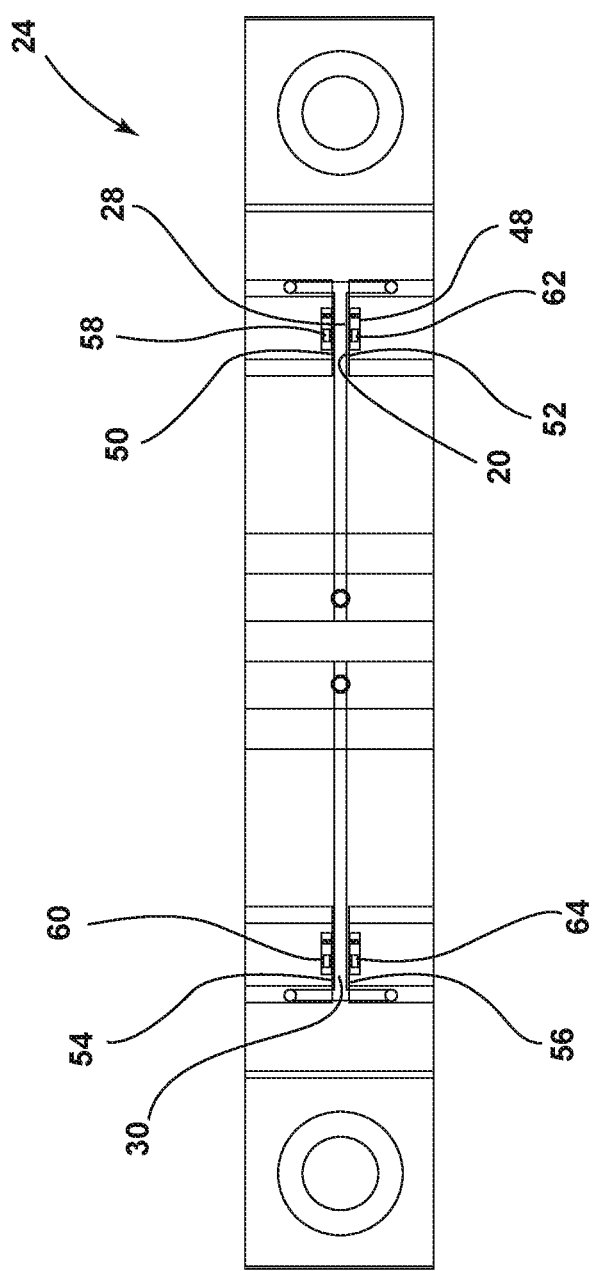
FIG. 5 is a top elevational view of an embodiment of an elongated mounting beam of the present invention showing strain gauges attached to isolation areas.

More particularly, in a circumstance when an elongated mounting beam 24 includes a first isolation area 28 and a second isolation area 30 positioned rearward of the first isolation area 28, the first isolation area 28 can have an inwardly facing surface 50 (see FIG. 5) and an outwardly facing surface 52. Likewise, the second isolation area 30 can have an inwardly facing surface 54 and an outwardly facing surface 56. The act of affixing at least one strain gauge 48 to at least one isolation area 20 can include affixing a first strain gauge 58 to the inwardly facing surface 50 of the first isolation area 28, affixing a second strain gauge 60 to the inwardly facing surface 54 of the second isolation area 30, affixing a third strain gauge 62 to the outwardly facing surface 52 of the first isolation area 28, and affixing a fourth strain gauge 64 to the outwardly facing surface 56 of the second isolation area 30.

Figure 6:
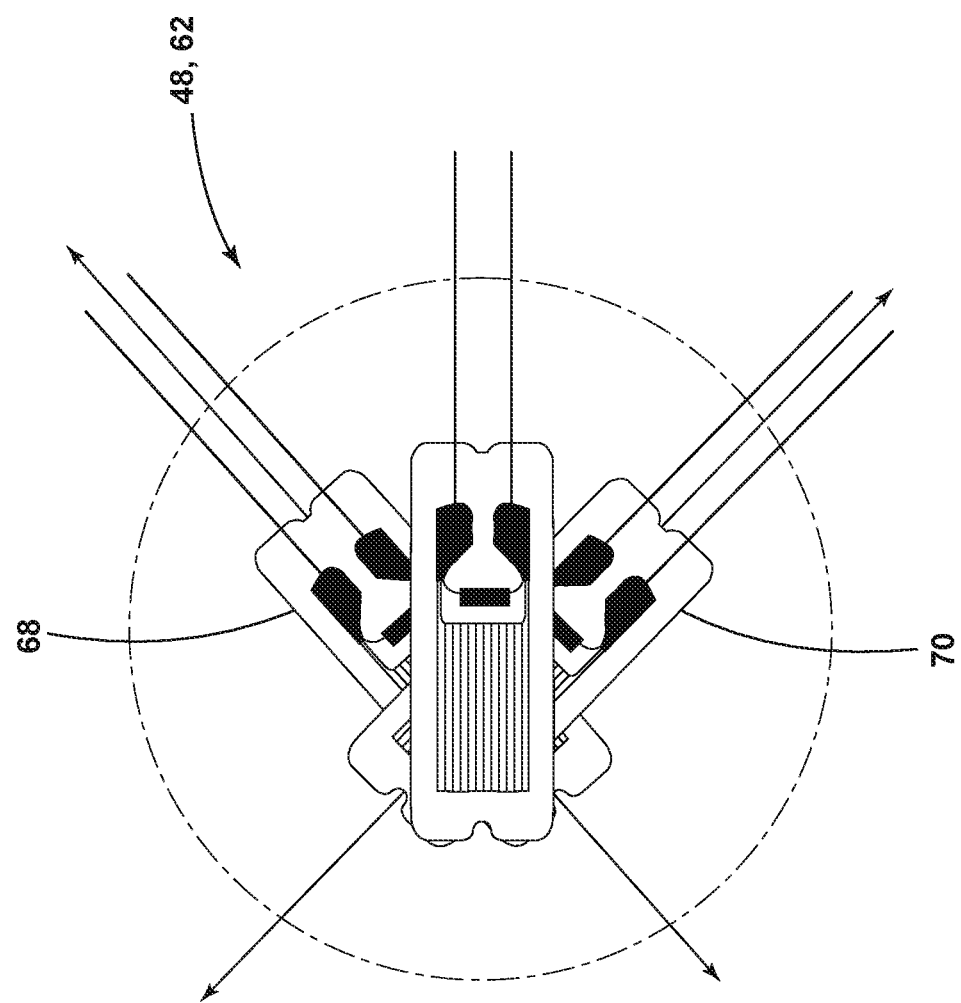
FIG. 6 is a cross-section, side elevational view of an embodiment of an elongated mounting beam of the present invention showing strain gauges attached to isolation areas.

As illustrated in FIG. 4, the elongated mounting beam 24 includes a neutral axis 66. The at least one strain gauge 48, such as strain gauges 58, 60, 62, and 64, can be affixed at the neutral axis 66 of the elongated mounting beam 24. In addition, the at least one strain gauge 48, such as strain gauges 58, 60, 62, and 64, can be affixed close to the center of a thin sections of the elongated mounting beam 24, i.e., the first isolation area 28 and second isolation area 30. As illustrated in FIG. 6, the strain gauges 58, 60, 62, and 64 can be a rosette type strain gauge including a separate α-strain gauge 68 and a β-strain gage 70. The α-strain gauge 68 and a β-strain gauge 70 can be configured to measure shear strain at ±45° with respect to a horizontal centerline, such as the neutral axis 66. The strain gauges 58, 60, 62, and 64 are thus sensitive to shear in the vertical (Fz) direction.

Figure 7:
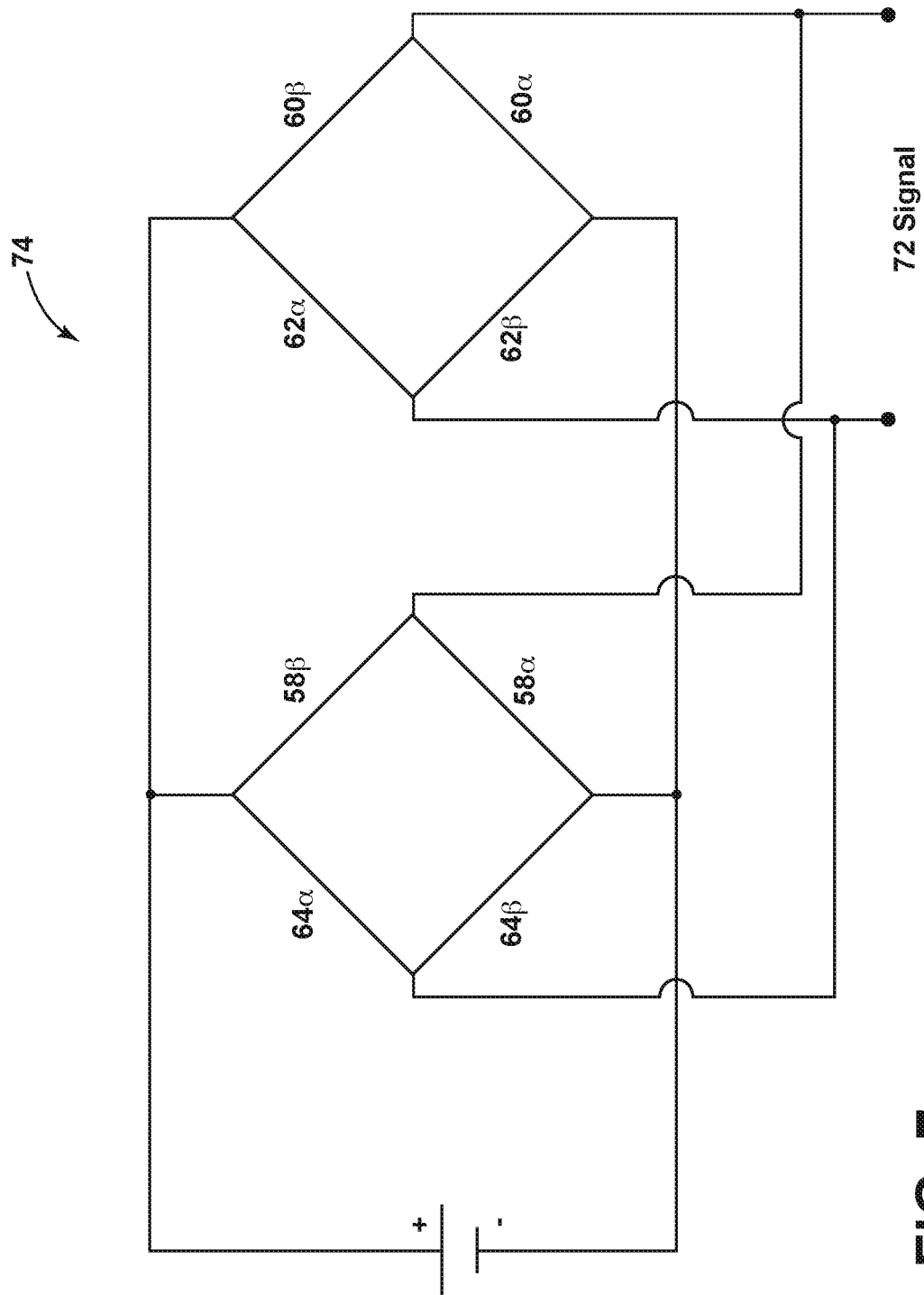
FIG. 7 is an electrical schematic diagram illustrating how strain gauges attached to an embodiment of an elongated mounting beam of the present invention are wired together in a parallel full bridge arrangement.

FIG. 7 illustrates how the α-strain gauge 68 and a β-strain gauge 70 of each of the strain gauges 58, 60, 62, and 64 can be electrically wired together in a parallel full bridge arrangement 74. As illustrated, the α-strain gauge 68 and a β-strain gauge 70 of each of the strain gauges 58, 60, 62, and 64 can be wired together in a parallel bridge. Because the strain gauges 58, 60, 62, 64 can be affixed at the neutral axis 66 and close to the center of a thin sections of the elongated mounting beam 24, i.e., the first isolation area 28 and second isolation area 30, measurements taken are largely immune to other directions of input force (crosstalk). Note that the strain gauges 58, 60, 62, and 64 can be wired in bridge arms that pair gauges affixed at opposite ends and opposite sides of the elongated mounting beam 24. For example, FIG. 7 illustrates how the α-strain gauge 68 and a β-strain gauge 70 of the fourth strain gauge 64 are paired with the α-strain gauge 68 and a β-strain gauge 70 of the first strain gauge 58 in a bridge. Likewise, the α-strain gauge 68 and a β-strain gauge 70 of the second strain gauge 60 are paired with the α-strain gauge 68 and a β-strain gauge 70 of the third strain gauge 62 in a bridge. The two bridges are then wired in parallel. Wiring the α-strain gauge 68 and a β-strain gauge 70 of each of the strain gauges 58, 60, 62, and 64 in this manner allows for balance and minimizes crosstalk in the output signals. The parallel full bridge arrangement 74 illustrated in FIG. 7 averages the individual measurement signals that the α-strain gauge 68 and a β-strain gauge 70 of each of the strain gauges 58, 60, 62, and 64 generate to produce one signal 72 of adequate sensitivity. The wires used in wiring each segment of parallel full bridge arrangement 74 can be of approximately equal length to minimize signal offsets. Utilizing full bridges and temperature compensated strain gauges minimizes nonlinearities and temperature dependence.

Figure 9:
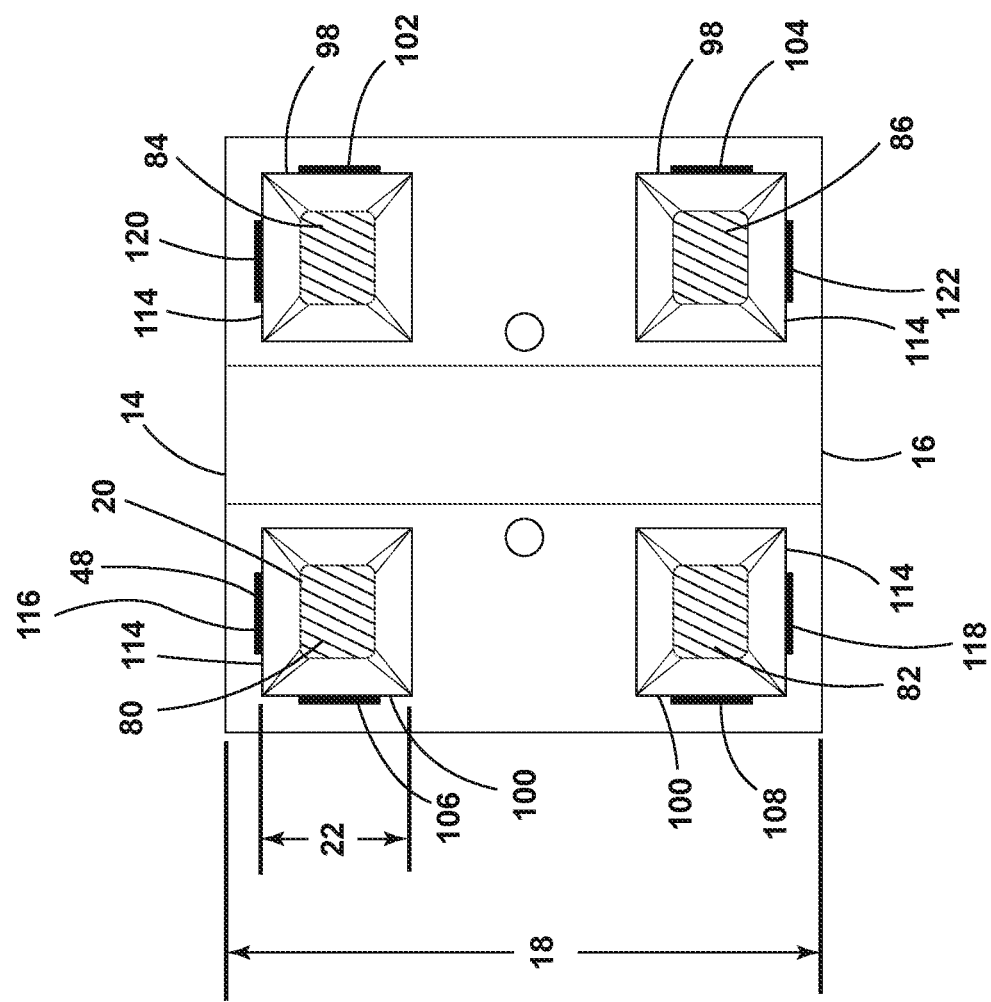
FIG. 9 is a top perspective view of an embodiment of a plurality of pillars of the present invention showing strain gauges attached to isolation areas.

Referring back to FIG. 2, the fifth wheel mounting bracket 10 can include a coupling portion 76. The coupling portion 76 is configured to pivotally couple to the fifth wheel hitch plate 12. In the illustrated example, the coupling portion 76 includes a plurality of pillars 78 that extend downwardly from the coupling portion 76. The plurality of pillars 78 (FIG. 9) can include the at least one isolation area 20 with the at least one isolation area 20 having a thickness that is less than the bracket thickness 18 between the outermost surface 16 and the innermost surface 14.

Figure 8:
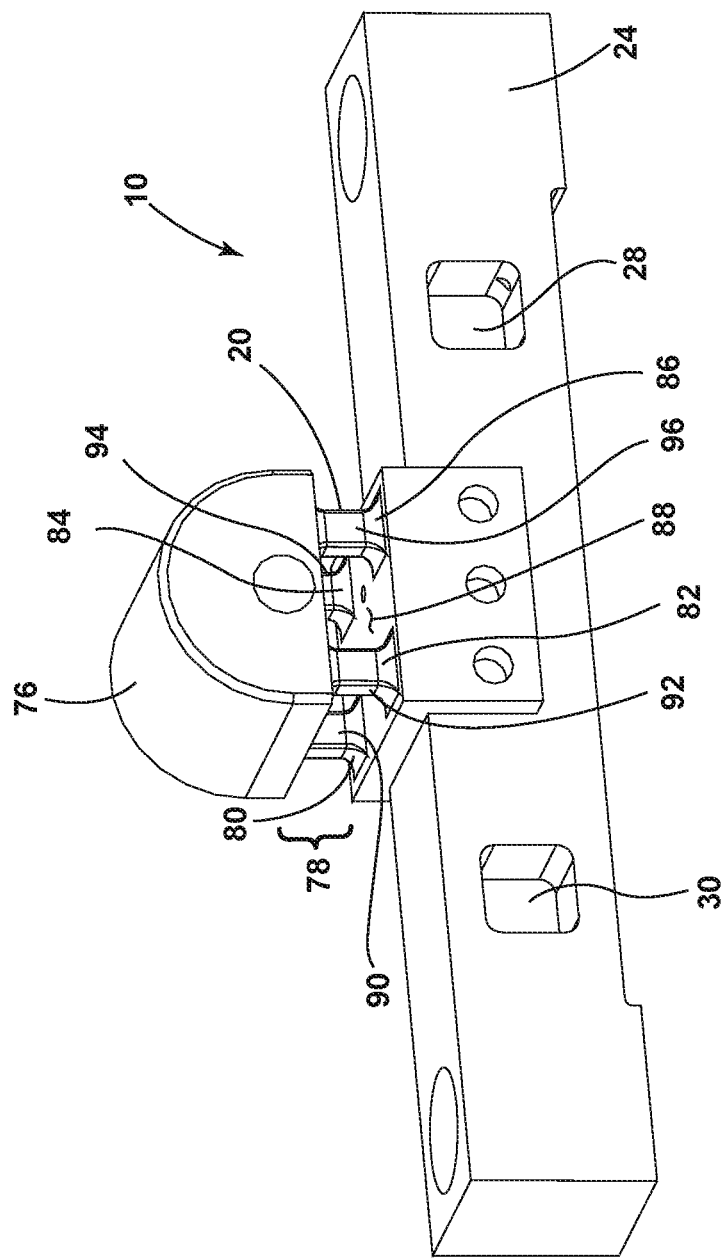
FIG. 8 is a side perspective view of an embodiment of the fifth wheel mounting bracket of the present invention.

For example, the plurality of pillars 78 (FIG. 8) can include a first pillar 80, a second pillar 82, a third pillar 84, and a fourth pillar 86, with the second pillar 82 being positioned outward of the first pillar 80, the third pillar 84 being positioned forward of the first pillar 80, and the fourth pillar 86 being positioned forward of the second pillar 82 and outward of the third pillar 84. The plurality of pillars 78 can cooperate to form a void space 88 beneath the coupling portion 76, and are disposed between the coupling portion 76 and the elongated mounting beam 24.

The at least one isolation area 20 can include a first isolation area 28, a second isolation area 30, and a third isolation area 90 formed by the plurality of pillars 78. The first pillar 80 can include the third isolation area 90. The at least one isolation area 20 can further include a fourth isolation area 92, a fifth isolation area 94, and a sixth isolation area 96. The second pillar 82 can include the fourth isolation area 92. The third pillar 84 can include the fifth isolation area 94. The fourth pillar 86 can include the sixth isolation area 96.

The first pillar 80 (FIG. 9), the second pillar 82, the third pillar 84, and the fourth pillar 86 each include a forward facing surface 98 and a rearward facing surface 100. The act of affixing the at least one strain gauge 48 to the at least one isolation area 20 can include affixing a first strain gauge 102 to the forward facing surface 98 of the third pillar 84, affixing a second strain gauge 104 to the forward facing surface 98 of the fourth pillar 86, affixing a third strain gauge 106 to the rearward facing surface 100 of the first pillar 80, and affixing a fourth strain gauge 108 to the rearward facing surface 100 of the second pillar 82.

Figure 10:
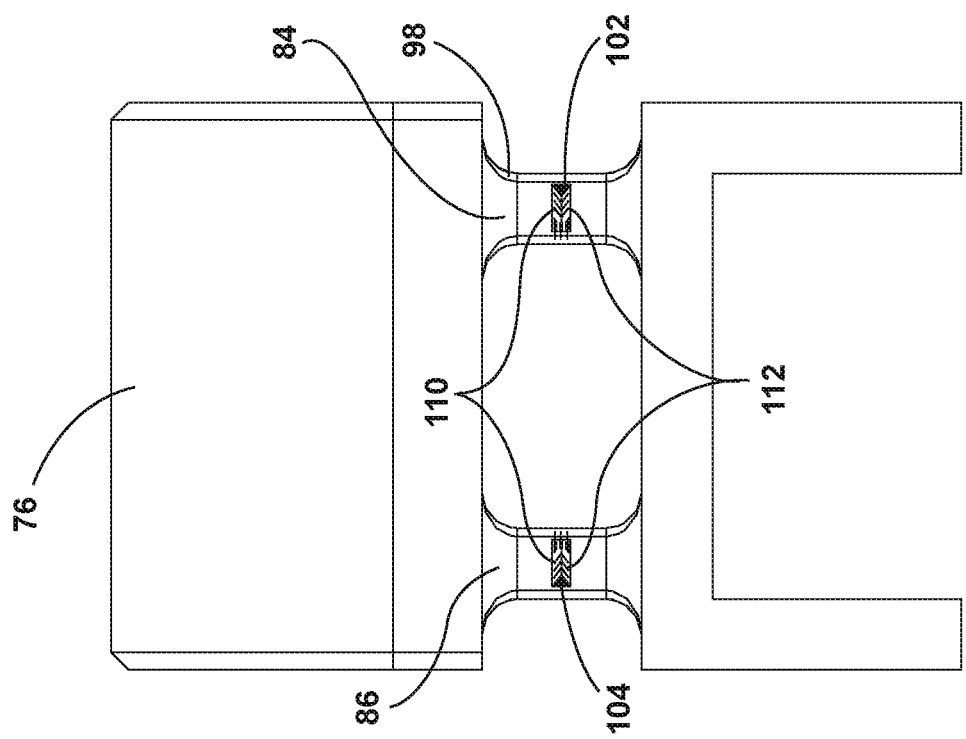
FIG. 10 is a side view of an embodiment of a plurality of pillars of the present invention showing strain gauges attached to isolation areas.

The first strain gauge 102 (FIG. 10), the second strain gauge 104, the third strain gauge 106, and the fourth strain gauge 108 can be shear grid strain gauges that measure strain at ±45° with respect to the horizontal centerline of the pillar to which is attached. More specifically, each of the first strain gauge 102, the second strain gauge 104, the third strain gauge 106, and the fourth strain gauge 108 include an α-strain gauge 110 and a β-strain gauge 112. The α-strain gauge 110 and β-strain gauge 112 of each of the first strain gauge 102, the second strain gauge 104, the third strain gauge 106, and the fourth strain gauge 108 can be wired together in a parallel full bridge arrangement similar to the parallel full bridge arrangement 74 described above. In other words, the α-strain gauge 110 and β-strain gauge 112 of the first strain gauge 102 can form a full bridge with the α-strain gauge 110 and β-strain gauge 112 of the fourth strain gauge 108. Likewise, the α-strain gauge 110 and β-strain gauge 112 of the second strain gauge 104 can form a full bridge with the α-strain gauge 110 and β-strain gauge 112 of the third strain gauge 106. The two full bridges can then be wired in parallel producing an averaged signal. Because the α-strain gauge 110 and β-strain gauge 112 of each of the first strain gauge 102, the second strain gauge 104, the third strain gauge 106, and the fourth strain gauge 108 act in shear, they are mostly immune from the vertical force which is also transmitted through the pillars 80, 82, 84, 86 into the elongated mounting beam 24. The averaged signal generated can be used to calculate the shear force exerted in the lateral direction.

The first pillar 80 (FIG. 9), the second pillar 82, the third pillar 84, and the fourth pillar 86 each further include an outward lateral facing surface 114 (outward relative to a middle point within the plurality of pillars 78). The act of affixing the at least one strain gauge 48 to the at least one isolation area 20 can include affixing a first strain gauge 116 to the outward lateral facing surface 114 of the first pillar 80, affixing a second strain gauge 118 to the outward lateral facing surface 114 of the second pillar 82, affixing a third strain gauge 120 to the outward lateral facing surface 114 of the third pillar 84, and affixing a fourth strain gauge 122 to the outward lateral facing surface 114 of the fourth pillar 86.

Figure 11:
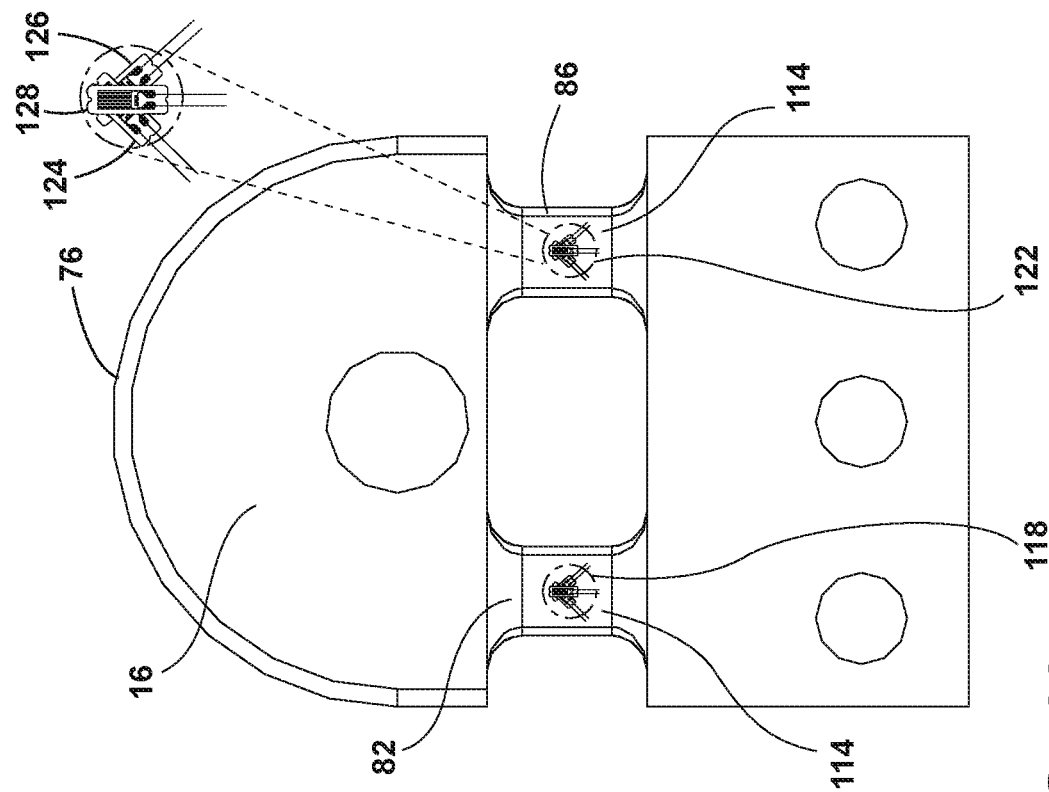
FIG. 11 is a side view of an embodiment of a plurality of pillars of the present invention showing strain gauges attached to isolation areas.

Referring now to FIG. 11, the first strain gauge 116, the second strain gauge 118, the third strain gauge 120, and the fourth strain gauge 122, can be a rosette type strain gauge that can measure shear at ±45° with respect to the horizontal centerline of the pillar to which is attached and perpendicular to the horizontal centerline. More specifically, each of the first strain gauge 116, second strain gauge 118, third strain gauge 120, and fourth strain gauge 122 can include an α-strain gauge 124, a β-strain gauge 126, and a γ-strain gauge 128. The α-strain gauge 124, a β-strain gauge 126 of each of the first strain gauge 116, second strain gauge 118, third strain gauge 120, and fourth strain gauge 122 can be wired together in a parallel full bridge arrangement similar to the parallel full bridge arrangement 74 described above. In other words, the α-strain gauge 124 and β-strain gauge 126 of the first strain gauge 116 can form a full bridge with the α-strain gauge 124 and β-strain gauge 126 of the fourth strain gauge 122. Likewise, the α-strain gauge 124 and β-strain gauge 126 of the second strain gauge 118 can form a full bridge with the α-strain gauge 124 and β-strain gauge 126 if the third strain gauge 120. The two full bridges can then be wired in parallel producing an averaged signal. Because the α-strain gauge 124 and β-strain gauge 126 of each of the first strain gauge 116, second strain gauge 118, third strain gauge 120, and fourth strain gauge 122 act in shear, they are mostly immune from the vertical force which is also transmitted through the pillars 80, 82, 84, 86 into the elongated mounting beam 24. The averaged signal generated can be used to calculate the shear force exerted in the forward direction.

The γ-strain gauge 128 of each of the first strain gauge 116, second strain gauge 118, third strain gauge 120, and fourth strain gauge 122 can be wired together in a single full bridge. Because only a single full bridge is made, there is no averaging. The signal generated from this single full bridge is a measurement of the roll moment about the forward direction.

The present inventive fifth wheel mounting bracket 10 incorporates an electronic load cell that utilizes multiple strain gauges to measure forces in the forward, lateral, and vertical directions (Fx, Fy, Fz) as well as the roll moment about the forward direction (Mx). Since the Fx gauges (i.e., the α-strain gauge 124 and β-strain gauge 126 of each of the first strain gauge 116, the second strain gauge 118, the third strain gauge 120, and the fourth strain gauge 122) and the Fy gauges (i.e., the the α-strain gauge 110 and β-strain gauge 112 of each of the first strain gauge 102, the second strain gauge 104, the third strain gauge 106, and the fourth strain gauge 108) are on perpendicular faces of separate pillars of a plurality of pillars 78 (such as four separate pillars), the gauges are intended to isolate single directions of input force. The plurality of pillars 78 design (such as four pillars) helps isolate and therefore resolve the forces into individually measureable signals while minimizing crosstalk from the other components.

The fifth wheel mounting bracket 10 described above produces four individual signals (signals for the Fx, Fy, Fz, and Mx), when a force is exerted on the structure (such as when a semi-trailer is attached to the fifth wheel hitch plate 12). More specifically, the right mounting bracket 130 and the left mounting bracket 132 each produce these signals. A data acquisition system can collect these signals. A post-processing operation can combine the collected data and produce the total loads as well as the individual right mounting bracket 130 and left mounting bracket 132 loads. This is very helpful for generating not only fifth-wheel loads but also loads seen by the individual brackets.

Figure 12:
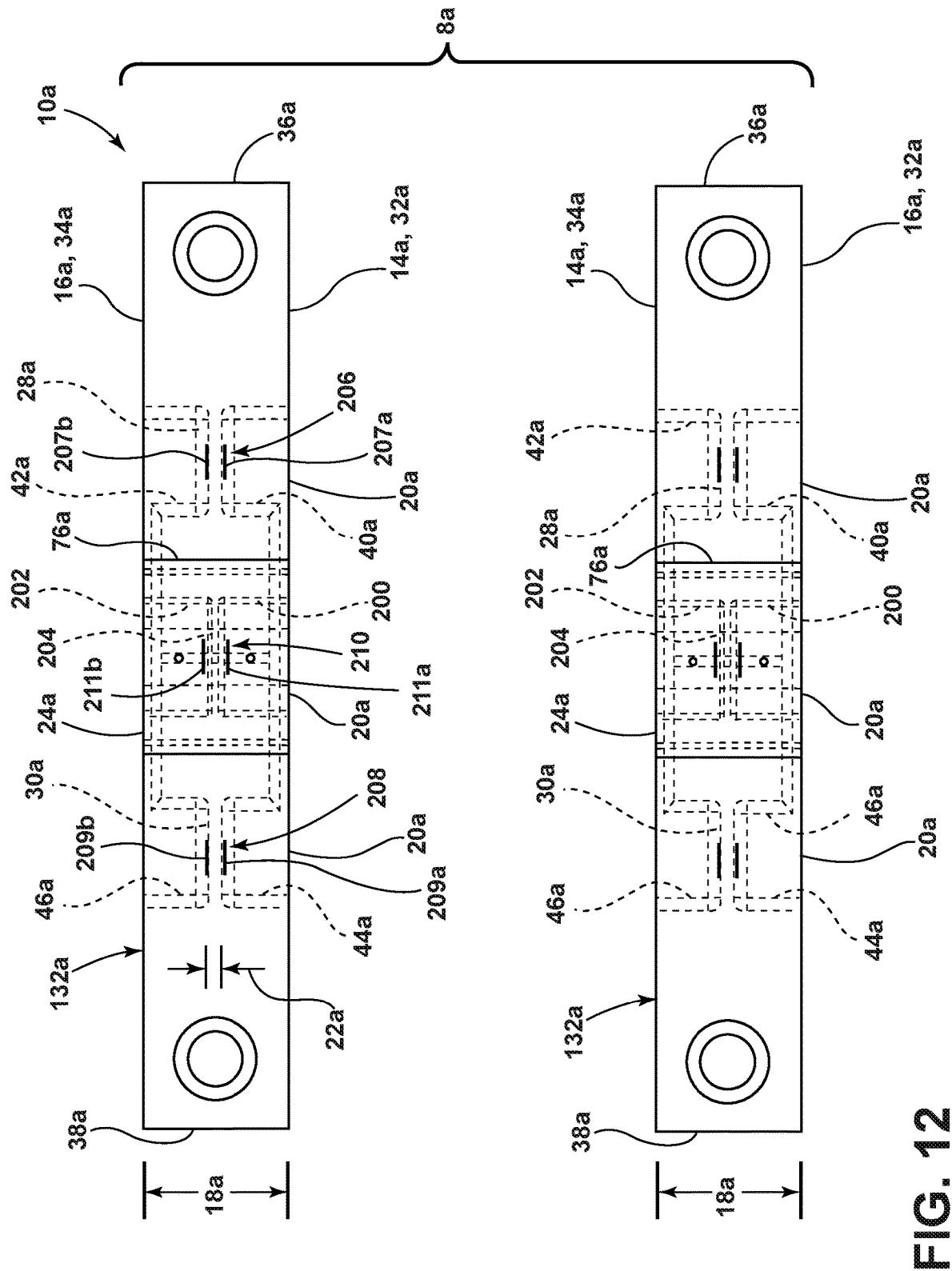
FIG. 12 is a top plan view of a pair of fifth wheel mounting brackets with an alternative embodiment of strain gauges attached to isolation areas of the mounting brackets.
Figure 13:
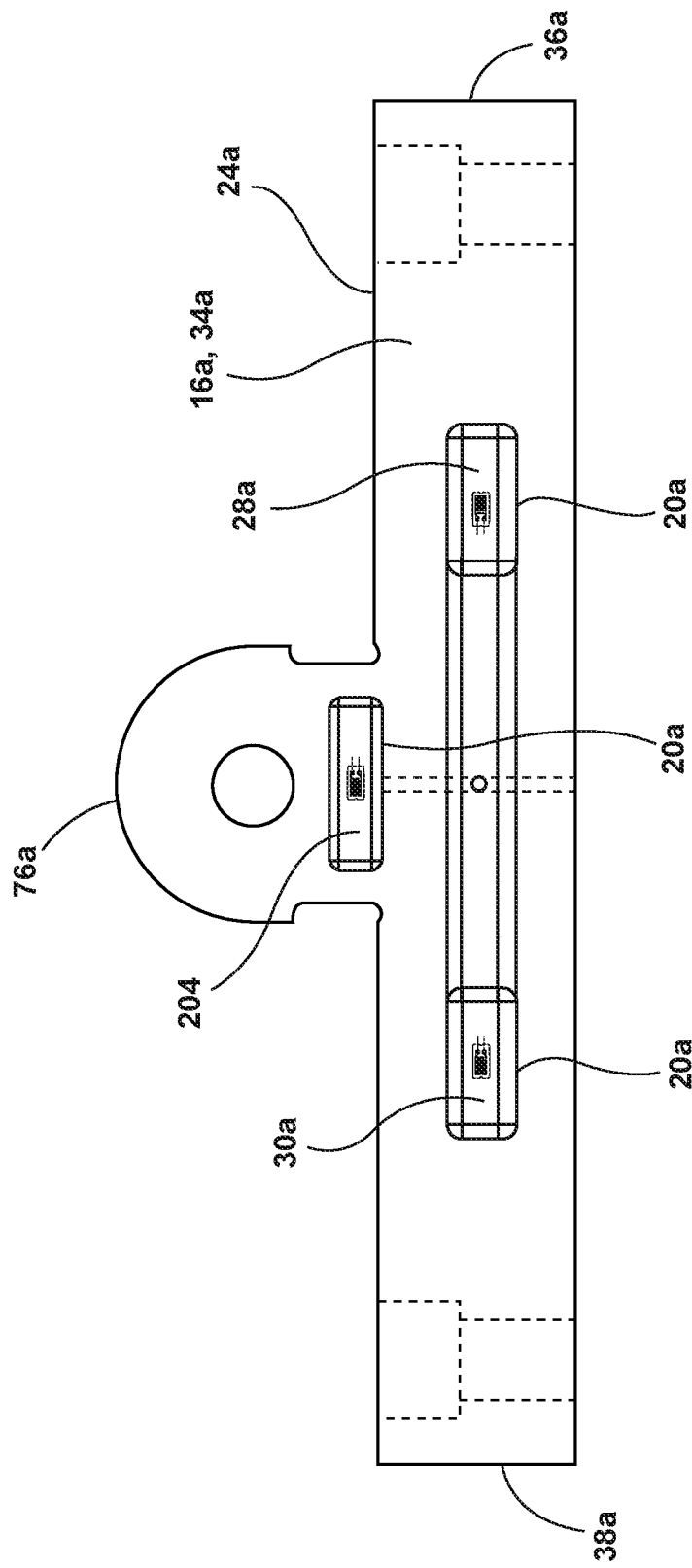
FIG. 13 is a side elevational view of a fifth wheel mounting bracket and strain gauges of FIG. 12.

The reference numeral 8a (FIGS. 12 and 13) generally designates another embodiment of the present invention. Since the fifth wheel hitch support arrangement 8a is similar to the previously described hitch arrangement 8, similar parts appearing in FIGS. 1-11 and FIGS. 12-17 respectively are represented by the same, corresponding reference numeral, except for the suffix "a" in the numerals of the latter. In the illustrated example, each elongated mounting beam 24a includes an inwardly facing surface 32a, an outwardly facing surface 34a, a forward end 36a and a rear end 38a. A first recess 40a is disposed within the inward facing surface 32a and a second recess 42a is disposed within the outward facing surface 34a, where the first recess 40a and the second recess 42a cooperate to form a first isolation area 28a. A third recess 44a is disposed within the inward facing surface 32a and a fourth recess 46a is disposed within the outward facing surface 34a, where the third recess 44a and the fourth recess 46a cooperate to form a second isolation area 30a that is positioned rearward of the first isolation area 28a. The mounting beam 24a further includes a fifth recess 200 disposed within the inward facing surface 32a, and a sixth recess 202 disposed within the outward facing surface 34a, where the fifth recess 200 and the sixth recess 202 cooperate to form a third isolation area 204 that is positioned rearward and above the first isolation area 28a, and forward and above the second isolation area 30a. The mounting beam 24a includes a bracket thickness 18a defined between the innermost surface 14a and the outermost surface 16a, while the isolation areas 28a, 30a, 204 each have an isolation area thickness 22a that is less than the bracket thickness 18a.

Figure 14:
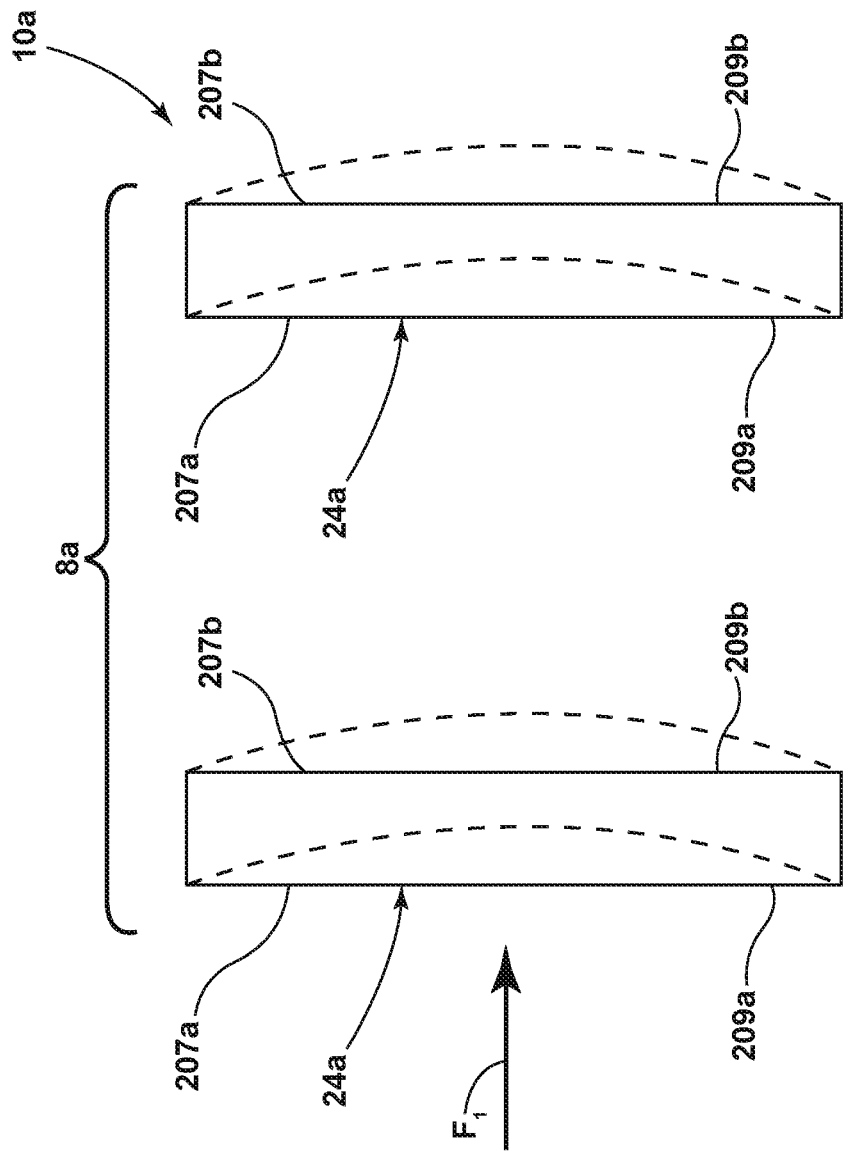
FIG. 14 is a schematic top plan view of the fifth wheel mounting brackets and strain gauges of FIG. 12 deflecting in response to any applied force.

In the illustrated example, the isolation areas 28a, 30a, 202 cooperate to define a two-dimensional load cell within the mounting beam 24a. An array of strain gauges includes a first pair of vertical strain gauges 206 including a first vertical strain gauge 207a and a second vertical strain gauge 207b that are secured to the inner and outer surfaces of the first isolation area 28a, a second pair of vertical strain gauges 208 including a third vertical strain gauge 209a and a fourth vertical strain gauge 209b that are secured to the inner and outer surfaces of the second isolation area 30a. A pair of longitudinal strain gauges 210 are secured to the inner and outer surfaces of the third isolation area 204. It is noted that the first pair of vertical strain gauges 206 and the second pair of vertical strain gauges 208 are configured to measure only vertical load, while the pair of longitudinal strain gauges 210 including a first longitudinal strain gauge 211a and a second longitudinal strain gauge 211b that are configured to measure only longitudinal load. This isolation of the measured loads is accomplished by the shape of the isolation area 20a and the configuration of the two separate bridge configurations which reduces the off-component force influence and signal cross talk in a manner similar to that as previously described with respect to the bridge configuration as illustrated in FIG. 7. This allows the outputs from each load cell to be used individually or in concert to produce the needed load information. FIG. 14 illustrates the distortion of the mounting beams 24a and the locations of the strain gauges 207a, 207b, 209a, 209b when subjected to a lateral loading or force F1. The gauges 207a, 209a are subjected to compressive strain. It is noted that 207a, 207b, 209a, 209b are subjected to the same strain. When wired in the parallel bridge configuration these common lateral strains cancel each other such that the vertical share grids are immune to the lateral loading effects.

As best illustrated in FIG. 15, the bracket 10a is distorted in a vertical direction when subjected to a pure vertical load F2. The outputs are wired in a manner similar to that as discussed above, and such that the bridge is sensitive only to a share distortion, and to each of the vertical grid locations, as best illustrated by the dashed lines. A longitudinal load F3 distorts the bracket 10a in the manner shown in FIG. 16. Because the vertical bridges are oriented and wired to be sensitive only to a vertical loading distortion, as illustrated in FIG. 15, the distortion as shown in FIG. 16 will cancel, such that the vertical bridges are immune from the longitudinal loading F3. Similarly, the share grids of the third isolation area 204 are mounted and wired to be sensitive to the longitudinal loading only, where the distortion caused by the longitudinal loading F3 are shown in dashed lines in FIG. 17. The vertical loading will have the same compressive effect on all four gauges of the two grids, such that the effect will cancel, not effecting the signal desired.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is as follows:

1. A fifth wheel mounting bracket arrangement, comprising:
   a mounting bracket, comprising:
      an elongated mounting beam configured to extend along a vehicle frame rail;
      a coupling portion configured to pivotally couple to a fifth wheel hitch plate; and
      a plurality of pillars disposed between the coupling portion and the elongated mounting beam, the plurality of pillars including a first pillar, a second pillar positioned outward of the first pillar, a third pillar positioned forward of the first pillar, and a fourth pillar positioned forward of the second pillar and outward of the third pillar, the plurality of pillars cooperating to form a void space beneath the coupling portion; and
   at least one strain gauge configured to measure a strain of the fifth wheel mounting bracket arrangement;
   wherein the elongated mounting beam includes an inward facing surface, an outward facing surface, a forward end, a rearward end, a first recess disposed within the inward facing surface, a second recess disposed within the outward facing surface, a third recess disposed within the inward facing surface and positioned rearward of the first recess, and a fourth recess disposed within the outward facing surface and positioned rearward of the second recess;
   wherein at least one strain gauge is attached to the first recess, the second recess, the third recess, and the fourth recess of the elongated mounting beam; and
   wherein at least one strain gauge is attached to the first pillar, the second pillar, the third pillar and the fourth pillar.

2. A fifth wheel mounting bracket arrangement, comprising:
   a mounting bracket including a coupling portion configured to pivotally couple to a fifth wheel hitch plate;

the mounting bracket including an innermost surface and an outermost surface defining a mounting bracket thickness;
at least one isolation area having isolation area thickness that is less than the mounting bracket thickness; and
at least one strain gauge positioned within the at least one isolation area and configured to measure a strain of the fifth wheel mounting bracket arrangement;
wherein the elongated mounting beam includes an inward facing surface, an outward facing surface, a forward end, a rearward end, a first recess disposed within the inward facing surface and a second recess disposed within the outward facing surface, the first and second recesses cooperating to form a first isolation area of the at least one isolation area.

3. The fifth wheel mounting bracket arrangement of claim 2, wherein the mounting bracket includes an elongated mounting beam configured to extend along a vehicle frame rail, the elongated mounting beam including the at least one isolation area.

4. The fifth wheel mounting bracket arrangement of claim 2, wherein the at least one isolation area includes the first isolation area and a second isolation area positioned rearward of the first isolation area.

5. The fifth wheel mounting bracket arrangement of claim 4, wherein the elongated mounting beam further includes a third recess disposed within the inward facing surface and a fourth recess disposed within the outward facing surface, the third and fourth recesses cooperating to form the second isolation area positioned rearward of the first isolation area.

6. The fifth wheel mounting bracket arrangement of claim 4, further comprising:
a plurality of pillars disposed between the coupling portion and the elongated mounting beam, wherein the at least one isolation area further includes a third isolation area, and wherein the plurality of pillars include the third isolation area.

7. The fifth wheel mounting bracket arrangement of claim 6, wherein the plurality of pillars include a first pillar, a second pillar, a third pillar, and a fourth pillar, wherein the at least one isolation area further includes a fourth isolation area, a fifth isolation area, and a sixth isolation area, and wherein the first pillar includes the third isolation area, the second pillar includes the fourth isolation area, the third pillar includes the fifth isolation area, and the fourth pillar includes the sixth isolation area.

8. The fifth wheel mounting bracket arrangement of claim 6, wherein the plurality of pillars includes a first pillar, a second pillar positioned outward of the first pillar, a third pillar positioned forward of the first pillar, and a fourth pillar positioned forward of the second pillar and outward of the third pillar, the plurality of pillars cooperating to form a void space beneath the coupling portion.

9. A fifth wheel mounting bracket arrangement, comprising:
a mounting bracket including a coupling portion configured to pivotally couple to a fifth wheel hitch plate;
the mounting bracket including an innermost surface and an outermost surface defining a mounting bracket thickness;
at least one isolation area having isolation area thickness that is less than the mounting bracket thickness;
at least one strain gauge positioned within the at least one isolation area and configured to measure a strain of the fifth wheel mounting bracket arrangement; and
a plurality of pillars extending downwardly from the coupling portion, and wherein the plurality of pillars include the at least one isolation area.

10. A method of measuring forces exerted on a fifth wheel mounting bracket arrangement, comprising:
providing a fifth wheel mounting bracket configured to pivotally support a fifth wheel hitch plate, the fifth wheel mounting bracket including an innermost surface and an outermost surface defining a bracket thickness, the fifth wheel mounting bracket further including at least one isolation area having an isolation area thickness that is less than the bracket thickness;
affixing at least one strain gauge to the at least one isolation area;
exerting a force to the fifth wheel mounting bracket;
measuring a strain of the fifth wheel mounting bracket via the strain gauge; and
calculating the force exerted on the fifth wheel mounting bracket, wherein calculating the force exerted on the fifth wheel mounting bracket includes at least one of calculating a shear surface in a vertical direction, calculating a shear force in a lateral direction, and calculating a roll force.

11. The method of claim 10, wherein the fifth wheel mounting bracket further includes an elongated mounting beam configured to extend along a vehicle frame rail, the elongated mounting beam including the at least one isolation area.

12. The method of claim 11, wherein the at least one isolation area includes a first isolation area and a second isolation area positioned rearward of the first isolation area, and wherein affixing the at least one strain gauge to the at least one isolation area includes affixing a first strain gauge of the at least one strain gauge to the first isolation area, and affixing a second strain gauge of the at least one strain gauge to the second isolation area.

13. The method of claim 12, wherein the elongated mounting beam includes an inward facing surface, an outward facing surface, a forward end, and a rear end, a first recess disposed within the inward facing surface and a second recess disposed within the outward facing surface, the first and second recesses cooperating to form the first isolation area, and wherein affixing the at least one strain gauge to the at least one isolation area includes affixing the first strain gauge to the inwardly facing surface of the first isolation area and affixing the second strain gauge to the inwardly facing surface of the second isolation area.

14. The method of claim 13, wherein the elongated mounting beam further includes a third recess disposed within the inward facing surface and a fourth recess disposed within the outward facing surface, the third and fourth recesses cooperating to form the second isolation area positioned rearward of the first isolation area, the first isolation area including an inwardly facing surface and an outwardly facing surface, the second isolation area including an inwardly facing surface and an outwardly facing surface, and wherein affixing the at least one strain gauge to the at least one isolation area includes affixing a third strain gauge of the at least one strain gauge to the outwardly facing surface of the first isolation area, and affixing a fourth strain gauge of the at least one strain gauge to the outwardly facing surface of the second isolation area.

15. The method of claim 10, wherein calculating the force exerted on the fifth wheel mounting bracket includes calculating the shear force exerted on the elongated mounting beam in the vertical direction.

16. The method of claim 10, wherein the fifth wheel mounting bracket includes a coupling portion configured to pivotally couple to a fifth wheel hitch plate and a plurality of pillars extending downwardly from the coupling portion, and wherein the plurality of pillars include the at least one isolation area.

17. The method of claim 16, wherein the plurality of pillars includes a first pillar, a second pillar positioned outward of the first pillar, a third pillar positioned forward of the first pillar, and a fourth pillar positioned forward of the second pillar and outward of the third pillar, the plurality of pillars cooperating to form a void space beneath the coupling portion.

18. The method of claim 17, wherein the first, second, third, and fourth pillars each include a forward facing surface and a rearward facing surface, and wherein affixing the at least one strain gauge to the at least one isolation area includes affixing a first strain gauge of the at least one strain gauge to the forward facing surface of the third pillar, affixing a second strain gauge of the at least one strain gauge to the forward facing surface of the fourth pillar, affixing a third strain gauge of the at least one strain gauge to the rearward facing surface of the first pillar, and affixing a fourth strain gauge of the at least one strain gauge to the rearward facing surface of the second pillar.

19. The method of claim 10, wherein calculating the force exerted on the fifth wheel mounting bracket includes calculating a roll force.

20. The method of claim 10, wherein calculating the force exerted on the fifth wheel mounting bracket includes calculating a shear force in a horizontal direction.

21. A method of calculating forces exerted on a structure supporting a fifth wheel mounting plate, comprising:
providing a structure operably coupled to a fifth wheel mounting plate;
affixing a strain gauge to an isolation area on the structure where a strain is to be measured;
exerting a force on the structure;
measuring the strain via the strain gauge; and
calculating the force exerted on the structure, wherein the force includes at least one of a force in the forward direction, a force in the lateral direction, and a roll force;
wherein affixing the strain gauge to the area on the structure where the strain is to be measured includes affixing a plurality of strain gauges each configured to be sensitive to a particular direction of force exerted on the structure;
wherein affixing the strain gauge to the area on the structure where the strain is to be measured further includes wiring the strain gauges together as a full bridge circuit; and
wherein affixing the strain gauge to the area on the structure where the strain is to be measured further includes wiring the strain gauges together as two parallel full bridge circuits.

22. The method of claim 20, wherein the lateral direction includes a forward direction.

* * * * *